US009288473B2

(12) United States Patent
Doi et al.

(10) Patent No.: US 9,288,473 B2
(45) Date of Patent: Mar. 15, 2016

(54) CREATING APPARATUS AND CREATING METHOD

(75) Inventors: Kazumi Doi, Fukuoka (JP); Teruyuki Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 677 days.

(21) Appl. No.: 13/354,856

(22) Filed: Jan. 20, 2012

(65) Prior Publication Data
US 2012/0229601 A1 Sep. 13, 2012

(30) Foreign Application Priority Data

Mar. 9, 2011 (JP) ................ 2011-052221

(51) Int. Cl.
H04N 13/00 (2006.01)
H04N 13/02 (2006.01)

(52) U.S. Cl.
CPC ....... *H04N 13/0239* (2013.01); *H04N 13/0022* (2013.01)

(58) Field of Classification Search
CPC .......... H04N 13/0239; H04N 13/0022; H04N 13/0018; H04N 21/44008; H04N 21/4122; H04N 21/4147; H04N 21/4325; H04N 13/0454; H04N 13/0011; H04N 13/0033; H04N 13/026; G06T 19/20; G09G 3/003
USPC .................................... 348/43, E13
See application file for complete search history.

(56) References Cited

U.S. PATENT DOCUMENTS

| | | | |
|---|---|---|---|
| 6,996,267 B2 * | 2/2006 | Tabata ...................... | 382/154 |
| 7,650,036 B2 | 1/2010 | Lei et al. | |
| 2005/0219239 A1 | 10/2005 | Mashitani et al. | |
| 2010/0309202 A1 | 12/2010 | Watanabe | |
| 2011/0018979 A1 * | 1/2011 | Ota et al. ................ | 348/51 |
| 2011/0292178 A1 * | 12/2011 | Goma et al. ............. | 348/46 |
| 2011/0310097 A1 | 12/2011 | Ushio et al. | |
| 2012/0206570 A1 * | 8/2012 | Tsukagoshi ............. | 348/43 |
| 2013/0027514 A1 * | 1/2013 | Cho et al. ................ | 348/43 |
| 2013/0063577 A1 * | 3/2013 | Jun et al. ................. | 348/53 |

(Continued)

FOREIGN PATENT DOCUMENTS

| | | |
|---|---|---|
| JP | 3-286693 A | 12/1991 |
| JP | 08-111876 A | 4/1996 |

(Continued)

OTHER PUBLICATIONS

Japanese Office Action mailed Apr. 30, 2014 for corresponding Japanese Patent Application 2011-052221, with English Translation, 9 pages.

*Primary Examiner* — Jay Patel
*Assistant Examiner* — Neil Mikeska
(74) *Attorney, Agent, or Firm* — Fujitsu Patent Center

(57) ABSTRACT

A creating apparatus includes a capturing unit, extracting units, and a creating unit. The capturing unit captures a plurality of video signals of images imaged at positions that are different by parallax. The extracting unit extracts a display time-period from at least one of the video signals from among the video signals. The creating unit creates, for a display time-period, a stereoscopic video signal by using the video signals of the images imaged at the positions that are different by parallax. Furthermore, the creating unit creates, for a time other than the display time-period, a stereoscopic video signal having a certain depth by using one of the video signals from among the video signals of the images imaged at the positions that are different by parallax.

12 Claims, 11 Drawing Sheets

(56) References Cited

U.S. PATENT DOCUMENTS

| | | | |
|---|---|---|---|
| 2013/0162641 A1* | 6/2013 | Zhang et al. | 345/419 |
| 2014/0176675 A1* | 6/2014 | Nagasawa et al. | 348/43 |

FOREIGN PATENT DOCUMENTS

| | | |
|---|---|---|
| JP | 2000-92513 A | 3/2000 |
| JP | 2001-054141 A | 2/2001 |
| JP | 2004-297540 A | 10/2004 |
| JP | 2005-124200 A | 5/2005 |
| JP | 2005-295004 A | 10/2005 |
| JP | 2010-171608 A | 8/2010 |
| JP | 2010-283715 A | 12/2010 |
| JP | 2011-101229 A | 5/2011 |
| JP | 2012-23567 A | 2/2012 |

* cited by examiner

FIG.3

|   | SCENE CHANGE | | MOTION VECTOR | | AUDIO | | USER INSTRUCTION | |
|---|---|---|---|---|---|---|---|---|
|   | START | END | START | END | START | END | START | END |
| 1 | 0 | 135 | 108 | 135 | 500 | 1000 | 1300 | 1600 |
| 2 | 810 | 1200 | 540 | 594 | | | | |

|    | CLK COUNTER |
|----|-------------|
| 1L | 0 |
| 2L | 900000 |
| 3L | 1800000 |
| 4L | 2700000 |
| 5L | 3600000 |

|    | CLK COUNTER |
|----|-------------|
| 1R | 800000 |
| 2R | 1700000 |
| 3R | 2600000 |
| 4R | 3500000 |

FIG.5A    FIG.5B
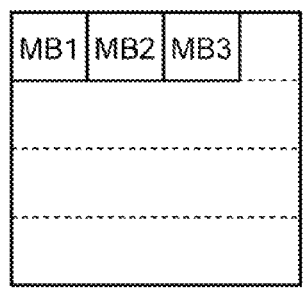 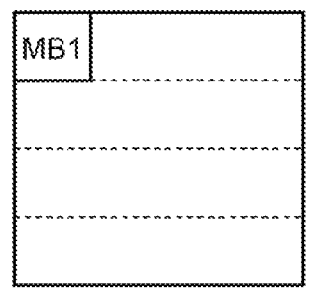
FIG.5C
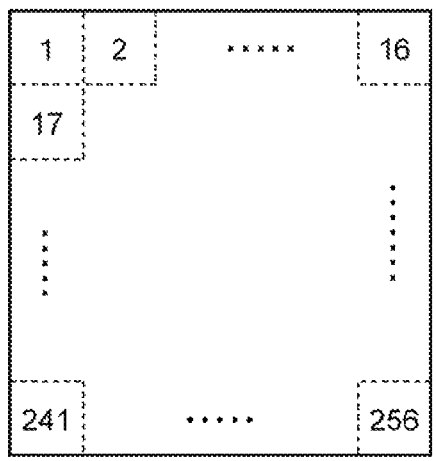 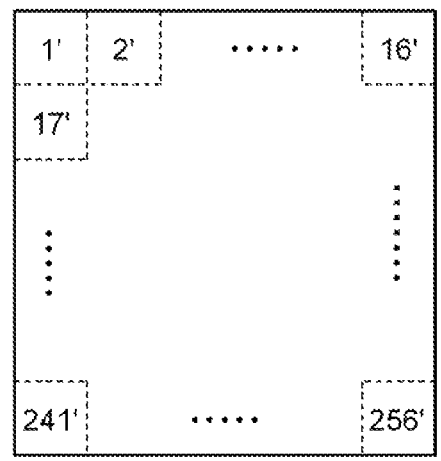
FIG.5D
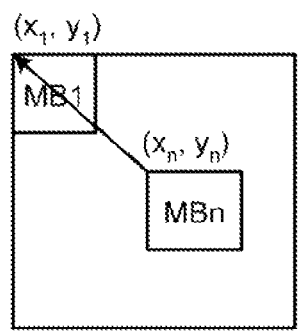

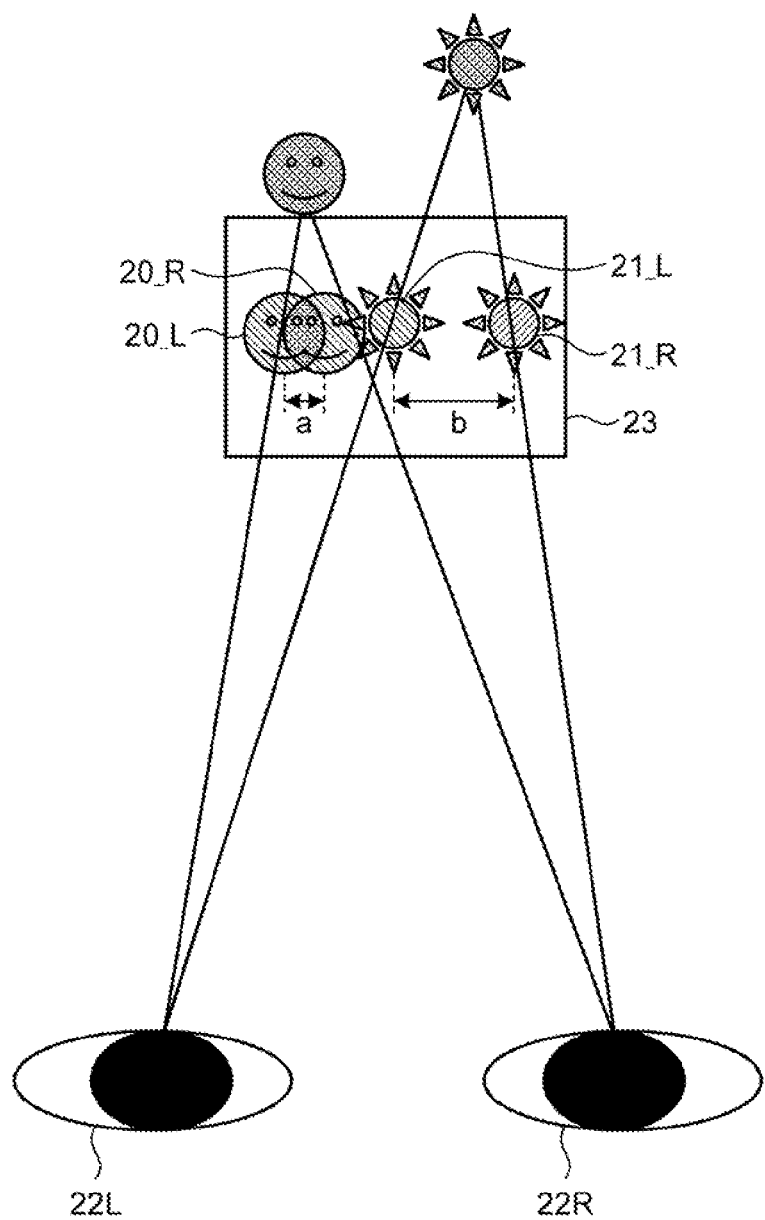

CREATING APPARATUS AND CREATING METHOD

CROSS-REFERENCE TO RELATED APPLICATION

This application is based upon and claims the benefit of priority of the prior Japanese Patent Application No. 2011-052221, filed on Mar. 9, 2011, the entire contents of which are incorporated herein by reference.

FIELD

The embodiments discussed herein are directed to a creating apparatus and a creating method.

BACKGROUND

There is a known technology for creating, from stereo images imaged by multiple imaging devices, stereoscopic images for displaying stereoscopic video images. The stereo images mentioned here indicate, for example, multiple images having predetermined parallax. Examples of these imaging devices include digital cameras, cameras mounted on mobile terminals, cameras mounted on personal computers (PC), or the like.

Furthermore, there is also a known technology for creating stereoscopic images, by using images imaged by a single imaging device and by using images obtained by moving, by the predetermined parallax, objects in the images that are acquired by the single imaging device with a simple structure when compared with a case in which multiple imaging devices are used.

Furthermore, there is also a known technology for switching stereoscopic video images and two-dimensional video images in accordance with the preferences of a user, such as a member of an audience.

Patent Document 1: Japanese Laid-open Patent Publication No. 2001-054141
Patent Document 2: Japanese Laid-open Patent Publication No. 2005-124200
Patent Document 3: Japanese Laid-open Patent Publication No. 08-111876

However, with the conventional technologies described above, there is a problem in that a burden is placed on the user. Specifically, with the conventional technologies, a user switches a stereoscopic video image to a two-dimensional video image by an operation. The stereoscopic video image is switched to the two-dimensional video image when, for example, the user feels tired. More specifically, because the user conceives a stereoscopic video image from a visually identified video image and composites the stereoscopic video image, when viewing the stereoscopic video image, the level of tiredness is large when compared with a case of viewing two-dimensional video images. Accordingly, in some cases, the user switches the stereoscopic video image to the two-dimensional video image that are less tiring to view. However, a burden has already been placed on the user at the time when the user feels tired.

The focal length of the eye of the user with respect to a stereoscopic video image is different from that with respect to a two-dimensional video image. Accordingly, the focal length varies when switching the stereoscopic video image to the two-dimensional video image, which is one of the burdens placed on a user.

SUMMARY

According to an aspect of an embodiment of the invention, a creating apparatus includes a capturing unit that captures a plurality of video signals of images imaged at positions that are different by parallax; an extracting unit that extracts a display time-period from at least one of the video signals from among the video signals; and a creating unit that creates, for the display time-period, a stereoscopic video signal by using the video signals of the images imaged at the positions that are different by parallax and the creating unit that creates, for a time other than the display time-period, a stereoscopic video signal having a certain depth by using one of the video signals from among the video signals of the images imaged at the positions that are different by parallax.

According to another aspect of an embodiment of the invention, a creating apparatus includes a processor coupled to the memory, wherein the processor executes a process includes capturing a plurality of video signals of images imaged at positions that are different by parallax; extracting a display time-period from at least one of the video signals from among the video signals; and creating, for the display time-period, a stereoscopic video signal by using the video signals of the images imaged at the positions that are different by parallax and the creating unit that creates, for a time other than the display time-period, a stereoscopic video signal having a certain depth by using one of the video signals from among the video signals of the images imaged at the positions that are different by parallax.

According to still another aspect of an embodiment of the invention, a creating method, executed by a computer, for creating a stereoscopic video signal from a plurality of video signals of images imaged at positions that are different by parallax, the creating method includes capturing the video signals of the images imaged at the positions that are different by parallax; extracting a display time-period from at least one of the video signals from among the video signals of the images imaged at the positions that are different by parallax; and creating, for the extracted display time-period, a stereoscopic video signal by using the video signals of the images imaged at the positions that are different by parallax and creates, for a time other than the display time-period, a stereoscopic video signal having a certain depth by using one of the video signals from among the video signals of the images imaged at the positions that are different by parallax.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a schematic diagram illustrating an example of a management table;
FIG. 4 is a schematic diagram illustrating an example of a process performed by a synchronizing unit;
FIG. 5A is a schematic diagram illustrating an example of a process performed by an analyzing unit;
FIG. 5B is a schematic diagram illustrating an example of a process performed by the analyzing unit;
FIG. 5C is a schematic diagram illustrating an example of a process performed by the analyzing unit;

FIG. 5D is a schematic diagram illustrating an example of a process performed by the analyzing unit;

FIG. 7 is a schematic diagram illustrating an example of the creating method for creating a signal of the first stereoscopic video image;

DESCRIPTION OF EMBODIMENTS

Preferred embodiments of the present invention will be explained with reference to accompanying drawings. The present invention is not limited to the embodiment. Furthermore, the embodiments can be appropriately used in combination as long as processes do not conflict with each other.

[a] First Embodiment

Configuration of a Creating Apparatus

Figure 1:
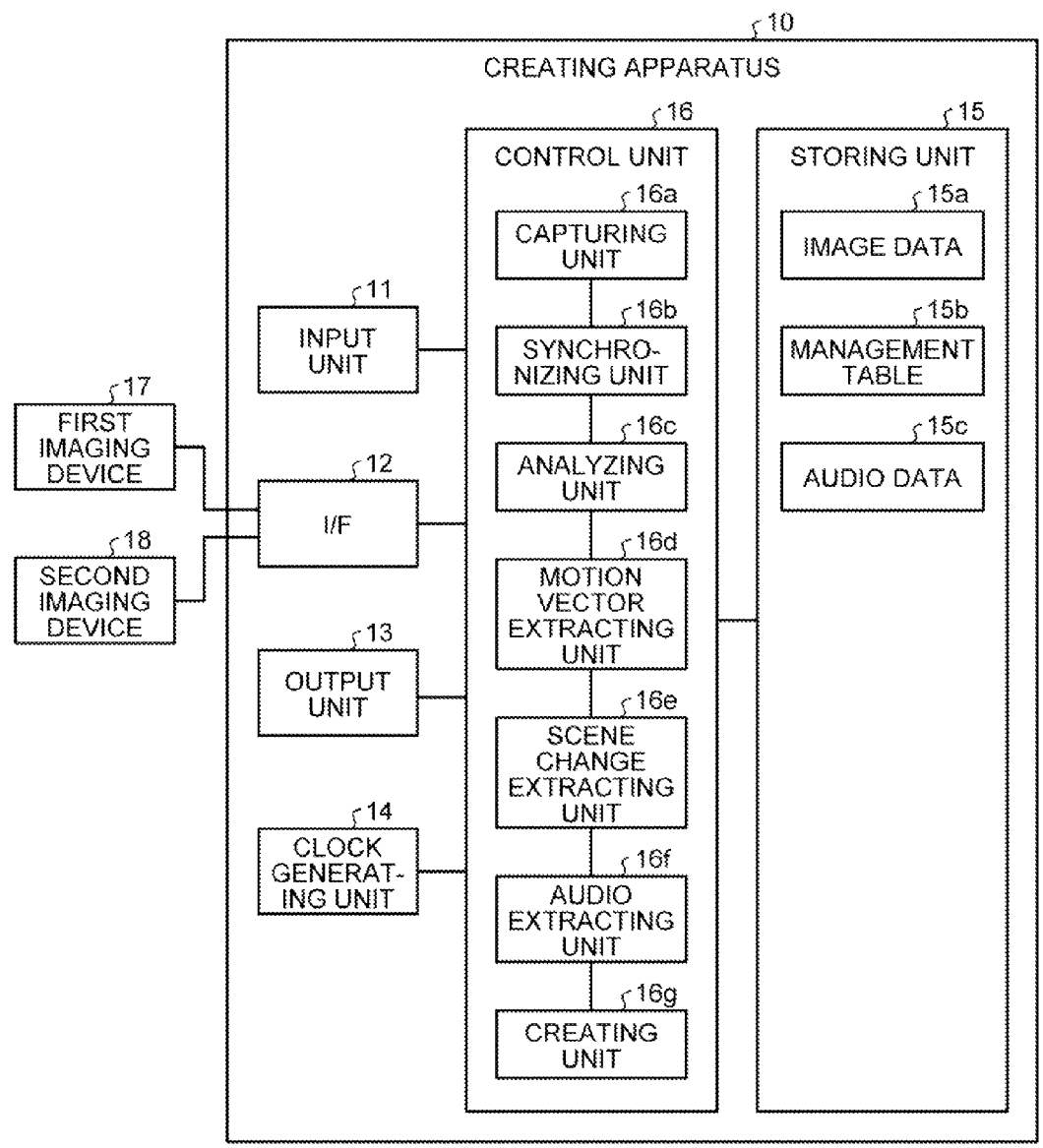
FIG. 1 is a block diagram illustrating an example of the configuration of a creating apparatus according to a first embodiment.

In the following, a creating apparatus according to a first embodiment will be described. FIG. 1 is a block diagram illustrating an example of the configuration of a creating apparatus according to a first embodiment. A creating apparatus 10 according to the first embodiment captures multiple video signals of images imaged at positions that are different by parallax. Furthermore, the creating apparatus 10 according to the first embodiment extracts a display time-period from at least one of the video signals from among the video signals. Furthermore, for the extracted display time-period, the creating apparatus 10 according to the first embodiment creates a stereoscopic video signal using multiple video signals of images imaged at positions that are different by parallax. Furthermore, for the time period other than the display time-period, by using one of the video signals from among the video signals of images imaged at positions that are different by parallax, the creating apparatus 10 according to the first embodiment creates a stereoscopic video signal having a certain depth. The creating apparatus 10 is connected to a first imaging device 17 and a second imaging device 18. As illustrated in FIG. 1, the creating apparatus 10 includes an input unit 11, an interface (I/F) 12, an output unit 13, a clock generating unit 14, a storing unit 15, and a control unit 16.

The input unit 11 inputs information to the control unit 16. For example, the input unit 11 receives an instruction from a user and inputs, to the control unit 16, an instruction to execute a creating process, which will be described later.

Furthermore, the input unit 11 receives an instruction from a user and inputs, to the control unit 16, a start time and an end time at which a first stereoscopic video image, which will be described later, is displayed. Examples of the input unit 11 include a keyboard, a mouse, or the like.

The I/F 12 is a communication interface that performs the communication among the first imaging device 17, the second imaging device 18, and the control unit 16. For example, the I/F 12 receives image data and audio data transmitted from the first imaging device 17 and the second imaging device 18 and transmits the received image data and the audio data to the control unit 16.

The output unit 13 outputs information. For example, the output unit 13 transmits, to a display (not illustrated), a stereoscopic video signal created by a creating unit 16g, which will be described later. Accordingly, a stereoscopic video image is displayed on the display.

The clock generating unit 14 generates a clock signal. For example, the clock generating unit 14 generates a clock signal for synchronizing the image data transmitted from the first imaging device 17 with the image data transmitted from the second imaging device 18 and transmits the generated clock signal to the control unit 16. The frequency of such a clock signal is, for example, 27 MHz. However, the frequency of the clock signal is not limited thereto. Any value can be used.

Each of the first imaging device 17 and the second imaging device 18 is arranged at a position having a predetermined distance and acquires, at a predetermined frame rate, a pair of different image data having a predetermined parallax. Furthermore, each of the first imaging device 17 and the second imaging device 18 acquires, at a predetermined frame rate, audio data associated with the acquired image data. Then, each of the first imaging device 17 and the second imaging device 18 transmits the acquired image data and the audio data to the creating apparatus 10. In the creating apparatus 10, because such image data is used as a signal for the video image, in the following description, there may be a case in which the "image data" is referred to as the "video signal".

The storing unit 15 stores therein various programs executed by the control unit 16. Furthermore, the storing unit 15 stores therein image data 15a captured by a capturing unit 16a, which will be described later. Furthermore, the storing unit 15 stores therein a management table 15b. Furthermore, the storing unit 15 stores therein audio data 15c captured by the capturing unit 16a, which will be described later.

Figure 2:
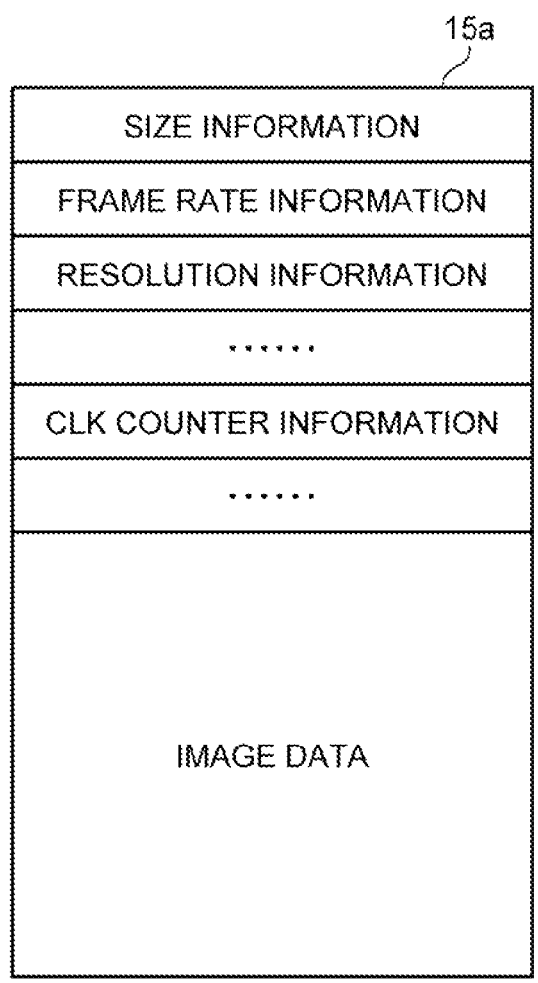
FIG. 2 is a schematic diagram illustrating an example of image data.

In the following, the image data 15a will be described. In addition to the image data each acquired by the first imaging device 17 and the second imaging device 18, the image data 15a contains various kinds of information. FIG. 2 is a schematic diagram illustrating an example of image data. In the example illustrated in FIG. 2, the image data 15a contains "size information" that indicates the size of the image data and that is detected by the capturing unit 16a, which will be described later. The "size information" is added to the image data.

Furthermore, in the example illustrated in FIG. 2, the image data 15a contains "frame rate information" that indicates information on the frame rate of the image data acquired by each of the first imaging device 17 and the second imaging device 18. The "frame rate information" is acquired, by the capturing unit 16a, from a driver of each of a first imaging device 17a and the second imaging device 18 and is added to the image data.

Furthermore, in the example illustrated in FIG. 2, the image data 15a contains "resolution information" that indicates the resolution of an image indicated by the image data. The "resolution information" is acquired, by the capturing unit 16a, from the driver of each of the first imaging device 17 and the second imaging device 18 and is added to the image data.

Furthermore, in the example illustrated in FIG. 2, the image data 15a contains "CLK counter information" that indicates the counts of the clock indicating the time at which the image data is captured. The "CLK counter information" is obtained by the capturing unit 16a, which will be described later, counting the counts of the clock that is generated by the clock generating unit 14. The capturing unit 16a adds the counts, as the "CLK counter information", to the image data.

In the following, the management table 15b will be described. The management table 15b is a table for registering the time period for which a first stereoscopic video signal of an image in which the depth of each object is not constant is displayed or the time period for which a second stereoscopic video signal of an image in which the depth of each object is constant is displayed. FIG. 3 is a schematic diagram illustrating an example of a management table. FIG. 3 illustrates a case in which, in the background of the video images indicated by the video signals, the management table 15b contains an item of a "scene change" in which the time period for which a background of the first stereoscopic video signal is displayed is registered. FIG. 3 illustrates a case in which the "start" indicating the start time and the "end" indicating the end time are indicated in the item of the "scene change". In the example illustrated in FIG. 3, the time period for which the background of the first stereoscopic video image is displayed is from "0" to "135" and from "810" to "1200". An example of the values includes the counts of the clock. Furthermore, an example of a numerical unit that can be used has a value of 1,000,000 units. The items of the "start" and the "end" of the "scene change" are registered by a scene change extracting unit 16e, which will be described later.

Furthermore, in the example illustrated in FIG. 3, an item of the "motion vector" is indicated in which the time period for which the second stereoscopic video signal is displayed is registered. FIG. 3 illustrates a case, as an example, in which the "start" indicating the start time and the "end" indicating the end time are indicated in the item of the "motion vector". In the example illustrated in FIG. 3, a case is illustrated in which the time period for which the second stereoscopic video image is displayed is from "108" to "135" and from "540" to "594". The items of the "start" and the "end" of the "motion vector" are registered by a motion vector extracting unit 16d, which will be described later.

Furthermore, in the example illustrated in FIG. 3, an item of the "audio" in which the time period for which the first stereoscopic video signal is displayed is registered. FIG. 3 illustrates a case, as an example, in which the "start" indicating the start time and the "end" indicating the end time of the item of the "audio" are indicated. In the example illustrated in FIG. 3, a case is illustrated in which the time period for which the first stereoscopic video image is displayed is from "500" to "1000". The items of the "start" and the "end" of the "audio" are registered by an audio extracting unit 16f, which will be described later.

Furthermore, in the example illustrated in FIG. 3, an item is registered of the "user instruction" in which the time period for which the first stereoscopic video signal is displayed. FIG. 3 illustrates a case, as an example, in which the "start" indicating the start time and the "end" indicating the end time of the item of the "user instruction" are indicated. For example, in the example illustrated in FIG. 3, a case is illustrated in which the time period for which the first stereoscopic video image is displayed is from "1300" to "1600". The items of the "start" and the "end" of the "user instruction" are registered by the capturing unit 16a, which will be described later.

In the following, the audio data 15c will be described. The audio data 15c indicates audio acquired, together with the image data, by the first imaging device 17 and the second imaging device 18.

The storing unit 15 is a semiconductor memory device, such as a flash memory, or a storage device, such as a hard disk, or an optical disk. However, the storing unit 15 is not limited to the type of storage device described above. For example, the storing unit 15 may also be a random access memory (RAM) or a read only memory (ROM).

As illustrated in FIG. 1, the control unit 16 includes an internal memory that stores therein control data and programs prescribing various procedures. These units execute various kinds of processes. The control unit 16 includes the capturing unit 16a, a synchronizing unit 16b, an analyzing unit 16c, the motion vector extracting unit 16d, the scene change extracting unit 16e, the audio extracting unit 16f, and the creating unit 16g.

The capturing unit 16a captures multiple video signals of images imaged at positions that are different by parallax. For example, the capturing unit 16a receives, via the I/F 12, image data transmitted from the first imaging device 17 and the second imaging device 18. The capturing unit 16a detects the size of the received image data. Furthermore, the capturing unit 16a acquires frame rate information from a driver of the first imaging device 17 or the second imaging device 18 that transmits the image data. Furthermore, the capturing unit 16a acquires resolution information from the driver of each of the first imaging device 17 and the second imaging device 18 that transmits the image data.

Furthermore, the capturing unit 16a counts the clock signal transmitted from the clock generating unit 14. For example, the capturing unit 16a detects the rising of the clock signal and increments the counter value by one every time the capturing unit 16a detects the rising of the clock signal.

Then, the capturing unit 16a adds, to the image data, the detected size, the acquired frame rate information, the acquired resolution information, and the counter value at the time of receiving the image data. Then, the capturing unit 16a stores, in the storing unit 15, the image data to which the size, the frame information, the resolution information, and the counter value are added. The image data to which the size, the frame information, the resolution information, and the counter value are added corresponds to the image data 15a described above.

Furthermore, the capturing unit 16a receives, via the I/F 12, the audio data 15c that is transmitted from the first imaging device 17 and the second imaging device 18. Then, the capturing unit 16a stores the received audio data 15c in the storing unit 15.

Furthermore, the capturing unit 16a registers, in the item of the "start" of the "user instruction" in the management table 15b, the start time of the displaying of the first stereoscopic video image that is input by the input unit 11. Furthermore, the capturing unit 16a registers, in the item of the "end" of the "user instruction" in the management table 15b, the end time of the displaying of the first stereoscopic video image that is input by the input unit 11. Accordingly, the time at which the first stereoscopic video image is displayed is registered in the management table 15b.

The synchronizing unit 16b synchronizes the image data transmitted from the first imaging device 17 and the second imaging device 18. For example, when the first imaging device 17 is used as a right-side imaging device corresponding to the right eye of a user and when the second imaging device 18 is used as a left-side imaging device corresponding to the left eye of the user, the synchronizing unit 16b performs the following process. Specifically, the synchronizing unit 16b defines, as image data of the stereo pair, image data transmitted from the left- and right-side imaging devices in which the value of the added "CLK counter information" is within a value obtained by multiplying a predetermined coefficient by the frame, e.g., is within a value of half of the frame.

FIG. 4 is a schematic diagram illustrating an example of a process performed by a synchronizing unit. FIG. 4 illustrates a case, as an example, in which the value of the "CLK counter information" that is added to image data 1R received from the first imaging device 17 is "800000". Furthermore, FIG. 4 illustrates a case, as an example, in which the value of the "CLK counter information" that is added to image data 2R received from the first imaging device 17 is "1700000". Furthermore, in the example illustrated in FIG. 4, a case is described in which the value of the "CLK counter information" that is added to image data 3R received from the first imaging device 17 is "2600000". Furthermore, FIG. 4 illustrates a case, as an example, in which the value of the "CLK counter information" added to image data 4R received from the first imaging device 17 is "3500000".

Furthermore, FIG. 4 illustrates a case, as an example, in which the value of the "CLK counter information" that is added to image data 1L received from the second imaging device 18 is "0". Furthermore, FIG. 4 illustrates a case, as an example, in which the value of the "CLK counter information" that is added to image data 2L received from the second imaging device 18 is "900000". Furthermore, FIG. 4 illustrates a case, as an example, in which the value of the "CLK counter information" that is added to image data 3L received from the second imaging device 18 is "1800000". Furthermore, FIG. 4 illustrates a case, as an example, in which the value of the "CLK counter information" that is added to image data 4L received from the second imaging device 18 is "2700000". Furthermore, FIG. 4 illustrates a case, as an example, in which the value of the "CLK counter information" that is added to image data 5L received from the second imaging device 18 is "3600000". The image data 1R to 4R and 1L to 5L are stored in the storing unit 15 by the capturing unit 16a.

In the example illustrated in FIG. 4, if the frequency of the clock is 27 MHz and if the frame rate is 30 fps, the synchronizing unit 16b performs the following process. Namely, the synchronizing unit 16b defines, as image data of the stereo pair, a pair of the image data transmitted from the left- and right-side imaging devices in which the value of the "CLK counter information" is within the value of (450000), i.e., a value obtained by multiplying the frame value (27000000/30) by ½. In the example illustrated in FIG. 4, the difference between the values of the image data 1R and the image data 2L contained in the "CLK counter information" is 100000 (900000-800000), which is within the value of half of the frame. Accordingly, the synchronizing unit 16b performs the following process. Namely, the synchronizing unit 16b defines the image data 1R and the image data 2L as image data of the stereo pair. Furthermore, in the example illustrated in FIG. 4, the synchronizing unit 16b defines, as image data of the stereo pair, the image data 2R and the image data 3L in which the difference between the values thereof in the "CLK counter information" is within the value of half of the frame. Furthermore, in the example illustrated in FIG. 4, the synchronizing unit 16b defines, as image data of the stereo pair, the image data 3R and the image data 4L in which the difference between the values thereof in the "CLK counter information" is within the value of half of the frame. Furthermore, in the example illustrated in FIG. 4, the synchronizing unit 16b defines, as image data of the stereo pair, the image data 4R and the image data 5L in which the difference between the values thereof in the "CLK counter information" is within the value of half of the frame.

The analyzing unit 16c analyzes image data. For example, the analyzing unit 16c analyzes image data transmitted from the first imaging device 17 or the second imaging device 18 and detects a motion vector. Furthermore, the analyzing unit 16c detects the difference of the motion vectors of the previous and the subsequent image data. Furthermore, the analyzing unit 16c also detects a scene change. The scene change mentioned here means a change in the background of a video image indicated by a video signal.

In the following, a process performed by the analyzing unit 16c will be specifically described. FIGS. 5A, 5B, 5C, and 5D are schematic diagrams each illustrating an example of a process performed by an analyzing unit. In the example illustrated in FIGS. 5A and 5B, a case is illustrated in which image data is divided into multiple blocks MB1, MB2, and MB3 .... Furthermore, in the example illustrated in FIG. 5C, a case is illustrated in which the number of pixels in each block is 256. Furthermore, the image data illustrated, as an example, in FIG. 5A and FIG. 5B is the image data that is transmitted from either one of the first imaging device 17 and the second imaging device 18. Furthermore, the image data illustrated, as an example, in FIG. 5B is the image data that is transmitted after a predetermined number of frames of image data illustrated in FIG. 5A, for example, after one frame is transmitted. In a description below, there may be a case in which the image data illustrated in FIG. 5A is referred to as the "previous image data". Furthermore, the image data illustrated in FIG. 5B may sometimes be referred to as the "subsequent image data".

The analyzing unit 16c selects one block that has not been selected from among multiple blocks of the subsequent image data. Then, from among the multiple blocks in the previous image data, the analyzing unit 16c calculates the difference between a pixel value of each of the pixels 1 to 256 in the selected block and a pixel value of each of the pixels 1' to 256'. Subsequently, the analyzing unit 16c calculates the sum of the calculated differences for each block in the previous image data. Then, the analyzing unit 16c specifies a block having the minimum sum in the previous image data. Then, the analyzing unit 16c calculates a difference vector between the location of the selected block in the subsequent image data and the location of the specified block in the previous image data and detects the calculated difference vector as a motion vector.

In the example illustrated in FIG. 5D, a case is illustrated in which the analyzing unit 16c specifies a block MBn in the previous image data. Furthermore, in the example illustrated in FIG. 5D, a case is illustrated in which the analyzing unit 16c selects a block MB1 in the subsequent image data. In the example illustrated in FIG. 5D, the analyzing unit 16c calculates the difference vector $(x_1-x_n, y_1-y_n)$ as a motion vector. Furthermore, in the example illustrated in FIG. 5D, the location of the block MBn in the previous image data is represented by $(x_n, y_n)$, whereas the location of the block MB1 in the subsequent image data is represented by $(x_1, y_1)$. The analyzing unit 16c repeatedly calculates such a motion vector until all of the blocks in the subsequent image data are selected. Then, the analyzing unit 16c performs the process for calculating such a motion vector on all of one of the pair of image data from among the image data defined as the stereo pair by the synchronizing unit 16b.

Then, the analyzing unit 16c calculates the size of the calculated motion vector. For example, if the motion vector is represented by (X, Y), the analyzing unit 16c calculates the size S of the motion vector using Equation (1) below:

$$S^2 = X^2 + Y^2 \qquad (1)$$

Furthermore, the analyzing unit 16c includes an excess-first-threshold counter, a within-first-threshold counter, and a first-state flag. The state indicated by the first-state flag includes an excess-threshold state and a within-threshold state. The initial state indicated by the first-state flag is assumed to be the within-threshold state. Furthermore, the value of the initial state of the excess-first-threshold counter is zero. Furthermore, the value of the initial state of the within-first-threshold counter is zero. When the state indicated by the first-state flag is the within-threshold state, if the size of the motion vector exceeds a predetermined threshold, the analyzing unit 16c increments the value of the excess-first-threshold counter by one. Furthermore, when the state of the first-state flag is the within-threshold state, if the size of the motion vector becomes equal to or less than the predetermined threshold, the analyzing unit 16c resets the value of the excess-first-threshold counter. If the time period for which the value of the excess-first-threshold counter is one is equal to or greater than a predetermined period of time, the analyzing unit 16c acquires the "CLK counter information" contained in the first image data 15a in which the value of the excess-first-threshold counter is one. Furthermore, if the time period for which the value of the excess-first-threshold counter is one is equal to or greater than the predetermined period of time, the analyzing unit 16c resets the value of the excess-first-threshold counter. Furthermore, if the time period for which the value of the excess-first-threshold counter is one is equal to or greater than the predetermined period of time, the analyzing unit 16c sets the state indicated by the first-state flag to the excess-threshold state.

Furthermore, when the state indicated by the first-state flag is the excess-threshold state, if the size of the motion vector is equal to or less than a predetermined threshold, the analyzing unit 16c increments the value of the within-first-threshold counter by one. Furthermore, when the state of the first-state flag is the excess-threshold state, if the size of the motion vector exceeds the predetermined threshold, the analyzing unit 16c resets the value of the within-first-threshold counter. If the time period for which the value of the within-first-threshold counter is one is equal to or greater than the predetermined period of time, the analyzing unit 16c acquires the "CLK counter information" contained in the first image data 15a in which the value of the within-first-threshold counter is one. Furthermore, if the time period for which the value of the within-first-threshold counter is one is equal to or greater than the predetermined period of time, the analyzing unit 16c resets the value of the within-first-threshold counter. Furthermore, if the time period for which the value of the within-first-threshold counter is one is equal to or greater than the predetermined period of time, the analyzing unit 16c sets the state of the first-state flag to the within-threshold state.

Furthermore, the analyzing unit 16c calculates the difference vector between the motion vectors of each of the blocks in the previous image data, for which the motion vectors are calculated, and the motion vectors of each of the blocks in the subsequent image data, for which the motion vectors are calculated. For example, the analyzing unit 16c calculates the difference vector $(x_{10}-x_{11}, y_{10}-y_{11})$ between the motion vector $(x_{10}, x_{10})$ of the block MB1 in the previous image data and the motion vector $(x_{11}, y_{11})$ of the block MB1 in the subsequent image data. Then, for the difference vectors calculated for the blocks, the analyzing unit 16c calculates the size of the difference vector for each block. The method for calculating the size of the difference vector is the same as that for calculating the size of the motion vector described above. Then, the analyzing unit 16c calculates the average value of the sizes of the difference vectors calculated for the blocks. For example, if the number of blocks in an image indicated by a single image data is 50, the analyzing unit 16c calculates the average value of the sizes of the difference vectors by dividing the sum of the sizes of the difference vectors, which are calculated for 50 blocks, by 50.

Furthermore, the analyzing unit 16c includes an excess-second-threshold counter, a within-second-threshold counter, and a second-state flag. The state indicated by the second-state flag includes an excess-threshold state and a within-threshold state. The initial state indicated by the second-state flag is the within-threshold state. Furthermore, the value of the initial state of the excess-second-threshold counter is zero. Furthermore, the value of the initial state of the within-second-threshold counter is zero. When the state indicated by the second-state flag is the within-threshold state, if the average value of the sizes of the difference vectors exceeds a predetermined threshold, the analyzing unit 16c increments the value of the excess-second-threshold counter by one. Furthermore, when the state indicated by the second-state flag is the within-threshold state, if the average value of the sizes of the difference vectors is equal to or less than the predetermined threshold, the analyzing unit 16c resets the value of the excess-second-threshold counter. Furthermore, if the time period for which the value of the excess-second-threshold counter is one is equal to or greater than a predetermined period of time, the analyzing unit 16c performs the following process. Namely, from among the previous and the subsequent image data 15a associated with the first difference vector in which the value of the excess-second-threshold counter is one, the analyzing unit 16c acquires the "CLK counter information" contained in the previous image data 15a. Here, the time indicated by the "CLK counter information" is assumed to be the time at which a scene change occurs. Furthermore, if the time period for which the value of the excess-second-threshold counter is one is equal to or greater than the predetermined period of time, the analyzing unit 16c resets the value of the excess-second-threshold counter. Furthermore, if the time period for which the value of the excess-second-threshold counter is one is equal to or greater than the predetermined period of time, the analyzing unit 16c sets the state indicated by the second-state flag to the excess-threshold state.

Furthermore, when the state indicated by the second-state flag is the excess-threshold state, if the average value of the sizes of the difference vectors is equal to or less than the predetermined threshold, the analyzing unit 16c increments the value of the within-second-threshold counter by one. Furthermore, when the state indicated by the second-state flag is the excess-threshold state, if the average value of the sizes of the difference vectors exceeds the predetermined threshold, the analyzing unit 16c resets the value of the within-second-threshold counter. Furthermore, if the time period for which the value of the within-second-threshold counter is one is equal to or greater than the predetermined period of time, the analyzing unit 16c resets the value of the within-second-threshold counter. Furthermore, if the time period for which the value of the within-second-threshold counter is one is equal to or greater than the predetermined period of time, the analyzing unit 16c sets the state indicated by the second-state flag to the within-threshold state.

Furthermore, for each of the audio data 15c acquired at each of the predetermined frame rates, the analyzing unit 16c calculates an audio volume. Furthermore, for each of the audio data 15c acquired at each of the predetermined frame rates, the analyzing unit 16c calculates the pitch of the audio.

Furthermore, the analyzing unit 16c includes an excess-third-threshold counter, a within-third-threshold counter, and a third-state flag. The state indicated by the third-state flag includes an excess-threshold state and a within-threshold state. The initial state indicated by the third-state flag is the within-threshold state. Furthermore, the value of the initial state of the excess-third-threshold counter is zero. Furthermore, the value of the initial state of the within-third-threshold counter is zero. When the state indicated by the third-state flag is the within-threshold state, if the volume and the pitch of the audio exceeds the predetermined threshold, the analyzing unit 16c increments the value of the excess-third-threshold counter by one. Furthermore, when the state indicated by the third-state flag is the within-threshold state, if at least one of the volume and the pitch of the audio becomes equal to or less than the predetermined threshold, the analyzing unit 16c resets the value of the excess-third-threshold counter. If the time period for which the value of the excess-third-threshold counter is one is equal to or greater than the predetermined period of time, the analyzing unit 16c acquires the "CLK counter information" contained in the image data 15a associated with the first audio data 15c in which the value of the excess-third-threshold counter is one. Furthermore, if the time period for which the value of the excess-third-threshold counter is one is equal to or greater than the predetermined period of time, the analyzing unit 16c resets the value of the excess-third-threshold counter. Furthermore, if the time period for which the value of the excess-third-threshold counter is one is equal to or greater than the predetermined period of time, the analyzing unit 16c sets the state indicated by the third-state flag to the excess-threshold state.

Furthermore, when the state indicated by the third-state flag is the excess-threshold state, if at least one of the volume and pitch of the audio becomes equal to or greater than the predetermined threshold, the analyzing unit 16c increments the value of the within-third-threshold counter by one. Furthermore, when the state indicated by the third-state flag is the excess-threshold state, if the volume and the pitch of the audio exceeds each of the predetermined thresholds, the analyzing unit 16c resets the value of the within-third-threshold counter. If the time period for which the value of the within-third-threshold counter is one is equal to or greater than the predetermined period of time, the analyzing unit 16c acquires the "CLK counter information" contained in the image data 15a associated with the first audio data 15c in which the value of the within-third-threshold counter is one. Furthermore, if the time period for which the value of the within-third-threshold counter is one is equal to or greater than the predetermined period of time, the analyzing unit 16c resets the value of the within-third-threshold counter. Furthermore, if the time period for which the value of the within-third-threshold counter is one is equal to or greater than the predetermined period of time, the analyzing unit 16c sets the state of the third-state flag to the within-threshold state.

In accordance with the motion vector analyzed by the analyzing unit 16c, the motion vector extracting unit 16d extracts a display time-period except for the time period for which images having a motion vector whose size is greater than the predetermined threshold continue. The display time-period mentioned here means the time period for which the first stereoscopic video image is displayed. For an image having a motion vector whose size exceeds the predetermined threshold, it is possible to determine that the movement of each object in the video image is greater than the predetermined value. Accordingly, for such a video image, the motion vector extracting unit 16d registers the time at which the second stereoscopic video image is created in the management table 15b such that the video image is created as a second stereoscopic video image that places less burden, compared with the first stereoscopic video image, on a user, such as a member of an audience.

For example, the motion vector extracting unit 16d registers, as the start time for displaying the first stereoscopic video image, the "CLK counter information" that is acquired by the analyzing unit 16c and is contained in the first image data 15a in which the value of the excess-first-threshold counter is one. Specifically, the motion vector extracting unit 16d registers the "CLK counter information" in the item indicated by the "start" of the "motion vector" in the management table 15b.

Furthermore, the motion vector extracting unit 16d registers, as the end time for displaying the first stereoscopic video image, the "CLK counter information" that is acquired by the analyzing unit 16c and is contained in the first image data 15a in which the value of the within-first-threshold counter is one. Specifically, the motion vector extracting unit 16d registers the "CLK counter information" in the item indicated by the "end" of the "motion vector" in the management table 15b.

The scene change extracting unit 16e extracts the display time-period in accordance with the scene change analyzed by the analyzing unit 16c. For example, for an image associated with the difference vector whose size exceeds the predetermined threshold, it is possible to determine that a scene change occurs at the time when the size exceeds the predetermined threshold. The first stereoscopic video image is more realistic than the second stereoscopic video image; however, the first stereoscopic video image places a burden on a user. Accordingly, the first stereoscopic video image and the second stereoscopic video image are preferably switched at an appropriate time for the user without causing any discomfort. Accordingly, to switch between the first stereoscopic video image and the second stereoscopic video image at the time at which the user feels less discomfort, the scene change extracting unit 16e performs the following process. Namely, the scene change extracting unit 16e registers a display time of each video image or one of the video images such that the first stereoscopic video image and the second stereoscopic video image are switched at the time of the occurrence of the scene change.

For example, by using the switching of the scenes at the time of the occurrence of the scene change, the scene change extracting unit 16e performs the operation such that the first stereoscopic video image is displayed in an odd numbered scene, such as a first scene, a third scene, or a fifth scene, whereas the second stereoscopic video image is displayed in an even numbered scene. Specifically, the scene change extracting unit 16e determines the time, as the time of the occurrence of the scene change, indicated by the "CLK counter information" that is acquired by the analyzing unit 16c and that can be assumed to indicate the occurrence of the scene change described above. The "CLK counter information" is contained in the previous image data 15a from among the previous and the subsequent image data 15a associated with the first difference vector in which the value of the excess-second-threshold counter is one. Then, the scene change extracting unit 16e calculates, in accordance with the "CLK counter information", the start time and the end time of the odd numbered scene. Then, the scene change extracting unit 16e registers the calculated start time of the odd numbered scene in the item of the "start" of the "scene change" in the management table 15b. Furthermore, the scene change extracting unit 16e registers the calculated end time of the odd numbered scene in the item of the "end" of the "scene change" in the management table 15*b*. Furthermore, the scene change extracting unit 16*e* may also calculate, in accordance with the "CLK counter information", the start time and the end time of the even numbered scenes and register them in the items of the "start" and "end" of the "scene change" in the management table 15*b*, respectively.

The audio extracting unit 16*f* extracts a display time-period in accordance with the audio analyzed by the analyzing unit 16*c*. Here, for the image data 15*a* associated with the audio data 15*c* in which the volume and the pitch of the audio exceed each of the thresholds, it is determined that the content of the video image has reached a climax. Accordingly, for such a video image, compared with the second stereoscopic video image, the audio extracting unit 16*f* registers the time at which the first stereoscopic video image is created in the management table 15*b* such that the video image is created as the first stereoscopic video image that is realistic.

For example, the audio extracting unit 16*f* registers, as the start time for displaying the first stereoscopic video image, the "CLK counter information" that is acquired by the analyzing unit 16*c* and is contained in the image data 15*a* associated with the first audio data 15*c* in which the value of the excess-third-threshold counter is one. Specifically, the audio extracting unit 16*f* registers the "CLK counter information" in the item of the "start" of the "audio" in the management table 15*b*.

Furthermore, the audio extracting unit 16*f* registers, as the end time for displaying the first stereoscopic video image, the "CLK counter information" that is acquired by the analyzing unit 16*c* and is contained in the image data 15*a* associated with the first audio data 15*c* in which the value of the within-third-threshold counter is one. Specifically, the audio extracting unit 16*f* registers the "CLK counter information" in the item of the "end" of the "audio" in the management table 15*b*.

For the display time-period, the creating unit 16*g* creates a stereoscopic video signal using multiple video signals of images imaged at positions that are different by parallax. Furthermore, for the time period other than the display time-period, by using one of the video signals from among the video signals of images imaged at positions that are different by parallax, the creating unit 16*g* creates a stereoscopic video signal having a certain depth.

For example, for the display time-period, the creating unit 16*g* creates a signal of the first stereoscopic video image by using the image data that is defined as the stereo pair by the synchronizing unit 16*b*. Furthermore, for the time period other than the display time-period, the creating unit 16*g* creates a signal of the second stereoscopic video image by using one of the image data from among the image data defined as the stereo pair by the synchronizing unit 16*b*.

Figure 6A:
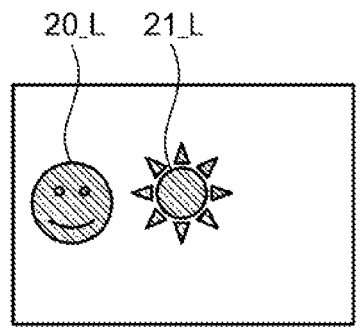
FIG. 6A is a schematic diagram illustrating an example of a creating method for creating a signal of a first stereoscopic video image.
Figure 6B:
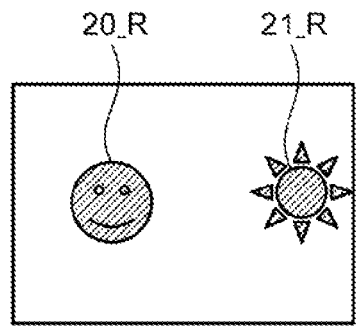
FIG. 6B is a schematic diagram illustrating an example of the creating method for creating a signal of the first stereoscopic video image.

In the following, the creating method of the first stereoscopic video signal and the second stereoscopic video signal will be specifically described. FIGS. 6A, 6B, and 7 are schematic diagrams each illustrating an example of a creating method for creating a signal of a first stereoscopic video image. FIG. 6A illustrates an example of an image indicated by the image data associated with the left eye of the user from among the image data defined as the stereo pair. In the example illustrated in FIG. 6A, the image includes the human face 20_L and the sun 21_L. FIG. 6B illustrates, as an example, from among the image data defined as the stereo pair, an image indicated by the image data associated with the right eye of the user. In the example illustrated in FIG. 6B, the image contains the human face 20_R and the sun 21_R. In the example illustrated in FIG. 7, the creating unit 16*g* creates a signal of the first stereoscopic video image by combining the image data defined as the stereo pair. In FIG. 7, a case is illustrated in which a left eye 22L and a right eye 22R of a user are separated from a display 23 by a predetermined distance. In such a case, in the example illustrated in FIG. 7, the creating unit 16*g* creates a signal of the first stereoscopic video image such that a parallax a of the human faces 20_L and 20_R displayed on the display 23 differs from a parallax b of the suns 21_L and 21_R displayed on the display 23. By allowing the parallax to differ in this way, the creating unit 16*g* can creates a video signal of an image in which each object has different depth.

Figure 8A:
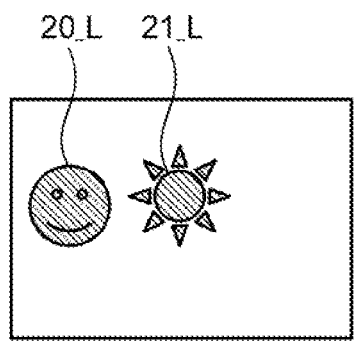
FIG. 8A is a schematic diagram illustrating an example of the creating method for creating a signal of a second stereoscopic video image.
Figure 8B:
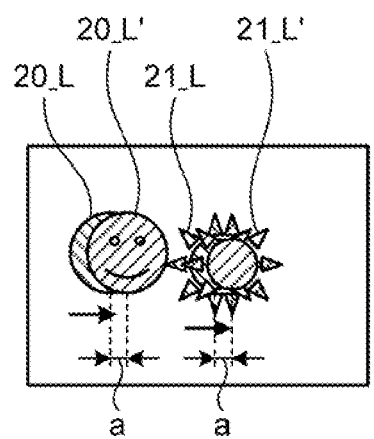
FIG. 8B is a schematic diagram illustrating an example of the creating method for creating a signal of the second stereoscopic video image.
Figure 9:
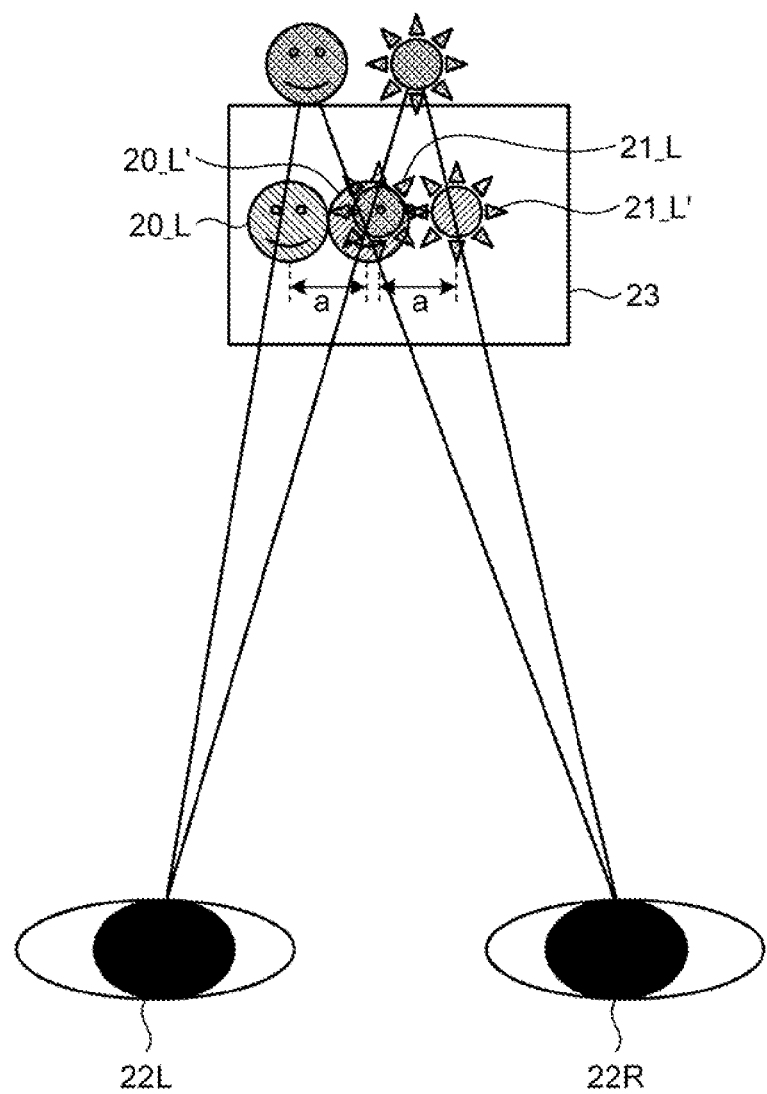
FIG. 9 is a schematic diagram illustrating an example of the creating method for creating a signal of the second stereoscopic video image.

FIGS. 8A, 8B, and 9 are schematic diagrams each illustrating an example of the creating method for creating a signal of a second stereoscopic video image. FIG. 8A illustrates an example of an image indicated by the image data that is associated with the left eye of the user and is the other image data from among the images indicated by the image data defined as the stereo pair. FIG. 8A illustrates a case in which the human face 20_L and the sun 21_L is contained in the image. FIG. 8B illustrates a case in which the creating unit 16*g* creates image data of the image containing a human face 20_L' and a sun 21_L' obtained by shifting the human face 20_L and the sun 21_L illustrated in FIG. 8A by the predetermined parallax a. In the example illustrated in FIG. 9, the creating unit 16*g* creates a signal of the second stereoscopic video image by combining the image data illustrated in FIG. 8A as an example and the image data illustrated in FIG. 8B as an example. FIG. 9 illustrates a case in which the left eye 22L and the right eye 22R of a user are separated from the display 23 by a predetermined distance. In such a case, in the example illustrated in FIG. 9, the creating unit 16*g* creates a signal of the second stereoscopic video image such that the parallax a of the human faces 20_L and 20_L' displayed on the display 23 matches the parallax a of the suns 21_L and 21_L' displayed on the display 23. In this way, by making the parallax the same, the creating unit 16*g* can create a video signal of an image in which each object has the same depth.

The creating unit 16*g* creates the first stereoscopic video image by using the image data displayed from the "start" of the "scene change" to the "end" of the "scene change" that is registered in the management table 15*b*. Furthermore, the creating unit 16*g* creates the first stereoscopic video image by using the image data displayed from the "start" of the "audio" to the "end" of the "audio" that is registered in the management table 15*b*. Furthermore, the creating unit 16*g* creates the first stereoscopic video image by using the image data displayed from the "start" of the "user instruction" to the "end" of the "user instruction" that is registered in the management table 15*b*. However, for the period of time from the "start" of the "motion vector" to the "end" of the "motion vector" registered in the management table 15*b*, the creating unit 16*g* creates the second stereoscopic video image. Furthermore, for the period of time other than from the "start" to the "end" of the "scene change", from the "start" to the "end" of the "audio", and from the "start" to the "end" of the "user instruction", the creating unit 16*g* creates the second stereoscopic video image.

For example, in the management table 15*b* illustrated in FIG. 3, two example cases are illustrated in which the "start" to the "end" of the "scene change" are "0" to "135" and "810" to "1200". Furthermore, in the management table 15*b* illustrated in FIG. 3, two example cases are illustrated in which the "start" to the "end" of the "motion vector" are "108" to "135" and "540" to "594". Furthermore, in the management table 15*b* illustrated in FIG. 3, an example case is illustrated in which the "start" to the "end" of the "audio" is "500" to "1000". In the management table 15*b* illustrated in FIG. 3, a case is illustrated in which the "start" to the "end" of the "user instruction" is "1300" to "1600". In the example illustrated in FIG. 3, the creating unit 16g creates the first stereoscopic video signal in a period of time from "0" to "107", from "500" to "539", from "595" to "1200", and from "1300" to "1600" and creates the second stereoscopic video signal in a period of time other than the above.

Figure 10:
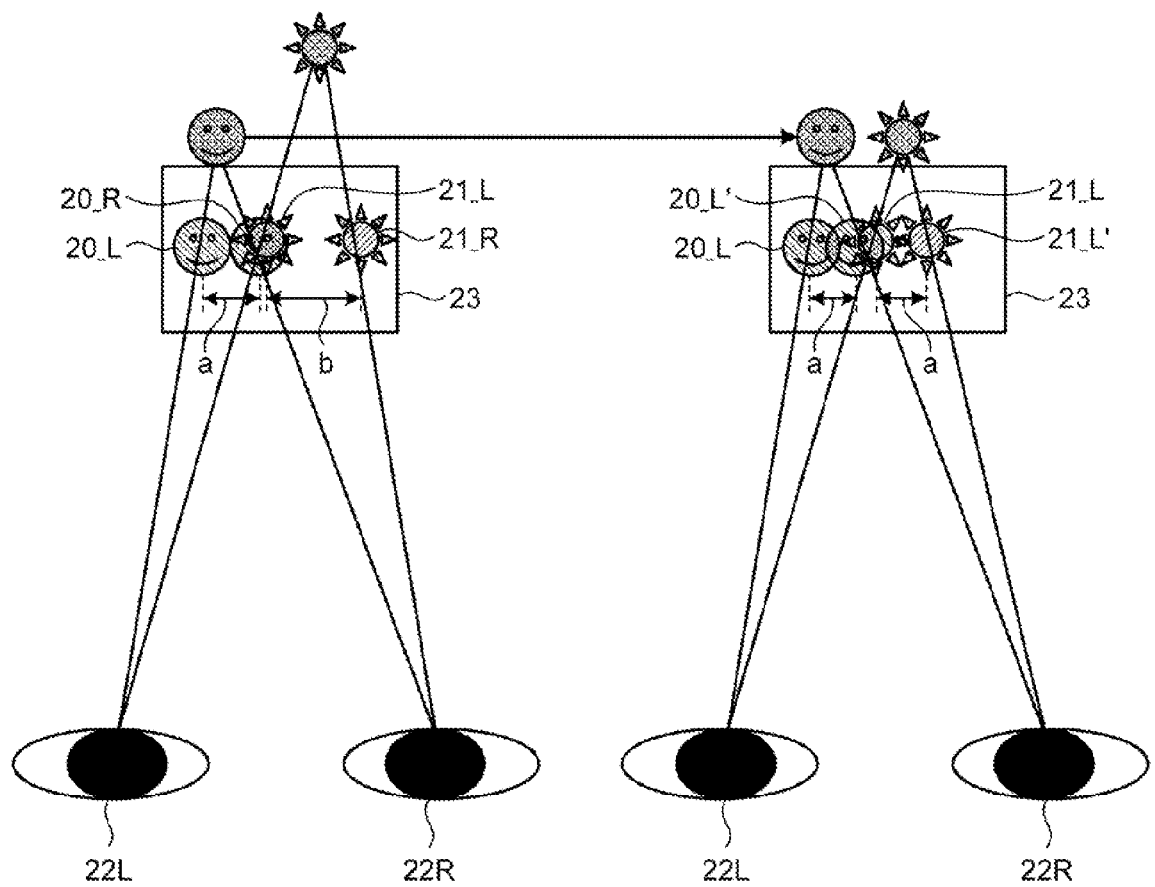
FIG. 10 is a schematic diagram illustrating an example of the first stereoscopic video image and the second stereoscopic video image created by a creating unit.

FIG. 10 is a schematic diagram illustrating an example of the first stereoscopic video image and the second stereoscopic video image created by a creating unit. In the first stereoscopic video image illustrated on the left side of FIG. 10, because the parallax a provided by the human faces 20_L and 20_R is different from the parallax b provided by the suns 21_L and 21_R, the depths of the objects differ. In contrast, in the second stereoscopic video image illustrated on the right of FIG. 10, because the parallax a provided by the human faces 20_L and 20_L' is the same as the parallax a provided by the suns 21_L and 21_R, the depths of the objects are the same. Furthermore, when creating the second stereoscopic video image, the creating unit 16g uses the parallax a used for the first stereoscopic video image. Accordingly, when the stereoscopic video image is switched from the first stereoscopic video image to the second stereoscopic video image, the movement of the focal point of a user becomes smaller. Therefore, the creating unit 16g can create a stereoscopic video image in which the tiredness of a user is suppressed.

Then, the creating unit 16g transmits the created stereoscopic video signal to the output unit 13. Furthermore, when switching the stereoscopic video image from the first stereoscopic video image to the second stereoscopic video image, the creating unit 16g can insert a black screen at the time of the scene change. Accordingly, it is possible to reduce a sense of discomfort due to the switching of video images.

The control unit 16 is an integrated circuit, such as an application specific integrated circuit (ASIC) or a field programmable gate array (FPGA), or an electronic circuit, such as a central processing unit (CPU) or a micro processing unit (MPU).

Flow of a Process

Figure 11:
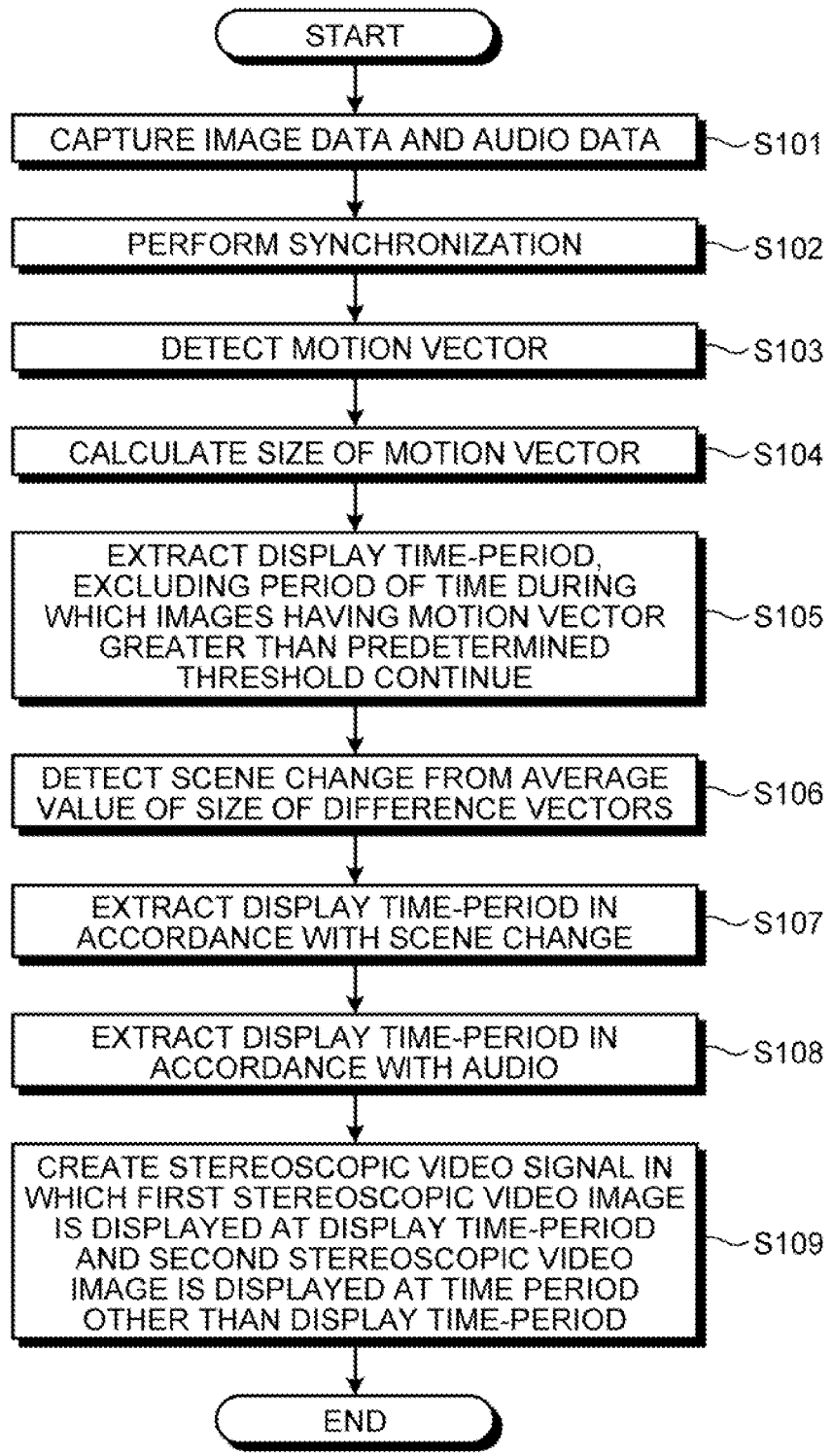
FIG. 11 is a flowchart illustrating the flow of a creating process according to the first embodiment.

In the following, the flow of a process performed by the creating apparatus 10 according to the first embodiment. FIG. 11 is a flowchart illustrating the flow of a creating process according to the first embodiment will be described. Various timing can be conceived for the execution timing of the creating process. For example, if a power supply of the creating apparatus 10 is turned on, the creating process is performed every time image data and audio data are transmitted from the first imaging device 17 and the second imaging device 18.

As illustrated in FIG. 11, the capturing unit 16a captures the image data and the audio data and stores them in the storing unit 15 (Step S101). The synchronizing unit 16b defines, as the image data of the stereo pair, image data transmitted from the left- and right-side imaging devices in which the value of the "CLK counter information" is a value obtained by multiplying a predetermined coefficient by a frame (Step S102). The analyzing unit 16c detects the motion vector of the image indicated by the image data (Step S103).

The analyzing unit 16c calculates the size of the calculated motion vector (Step S104). In accordance with the motion vector, the motion vector extracting unit 16d extracts the display time-period, except for the period of time period for which images having a motion vector greater than the predetermined threshold continue (Step S105). The analyzing unit 16c calculates the average value of the difference vectors between the motion vector of the previous image data block and the motion vector of the subsequent image data block and detects a scene change from the calculated average value (Step S106). In accordance with the scene change, the scene change extracting unit 16e extracts the display time-period (Step S107). In accordance with the audio, the audio extracting unit 16f extracts the display time-period (Step S108). The creating unit 16g creates a stereoscopic video signal in which the first stereoscopic video image is displayed at the display time-period and the second stereoscopic video image is displayed at the time period other than the display time-period (Step S109) and then ends the process.

Advantage of the First Embodiment

As described above, the creating apparatus 10 according to the first embodiment extracts the display time-period from the video signal transmitted from the first imaging device 17 or the second imaging device 18. Furthermore, for the display time-period, the creating apparatus 10 according to the first embodiment creates a stereoscopic video signal using multiple video signals of images imaged at positions that are different by parallax. For the time period other than the display time-period, by using one of the video signals from among the video signals of the images imaged at the positions that are different by parallax, the creating apparatus 10 according to the first embodiment creates a stereoscopic video signal having a certain depth. Accordingly, with the creating apparatus 10 according to the first embodiment, in the time period other than the display time-period, because the stereoscopic video signal indicating the stereoscopic video image that has a certain depth and that is less tiring for a user to view is created, it is possible to further reduce the burden placed on a user.

Furthermore, the creating apparatus 10 according to the first embodiment determines whether the motion vector is greater than the predetermined threshold for each image indicated by the video signal and extracts, except for the time period for which images having the motion vector that is greater than the predetermined threshold continue, the display time-period period for which the first stereoscopic video image is displayed. Accordingly, the creating apparatus 10 according to the first embodiment can extract, in accordance with the motion vector, the display time-period period for which the first stereoscopic video image is displayed.

Furthermore, the creating apparatus 10 according to the first embodiment determines whether a scene change occurs for each image indicated by a video signal and extracts, in accordance with the image in which the scene change occurs, the start time or the end time of the display time-period period for which the first stereoscopic video image is displayed. Accordingly, the creating apparatus 10 according to the first embodiment can extract, in accordance with the scene change, the display time-period for which the first stereoscopic video image is displayed.

Furthermore, the creating apparatus 10 according to the first embodiment determines, for each image indicated by the video signal, whether the audio is greater than the predetermined threshold and extracts, as the display time-period, the time period for which images having the audio that is greater than the predetermined threshold continue. Accordingly, the creating apparatus 10 according to the first embodiment can extract, in accordance with the audio, the display time-period period for which the first stereoscopic video image is displayed.

In the above explanation, the first embodiment of the present invention has been described; however, the present invention can be implemented with various kinds of embodiments other than the embodiment described above. Therefore, another embodiment included in the present invention will be described below.

In the first embodiment, a case has been described in which the display time-period is extracted in accordance with the motion vector, the scene change, and the audio analyzed from the video signal. However, the device disclosed in the present invention is not limited thereto. For example, the device disclosed in the present invention can extract the display time-period in accordance with at least one of the motion vector, the scene change, and the audio analyzed from the video signal.

For example, of the processes described in the first embodiment, the whole or a part of the processes that are mentioned as being automatically performed can also be manually performed. For example, a user may also input an instruction to execute a creating process via an operation receiving device (not illustrated).

Furthermore, in accordance with various loads or the operation state, processes performed at each Step described in the first embodiment may also arbitrarily be separated or be integrated each other. Furthermore, some Step may also be omitted. For example, processes performed at Steps S106 and S107 may also be integrated.

Furthermore, in accordance with various loads or use conditions, it is also possible to change the order of processes performed at each Step described in the first embodiment. For example, before performing the processes at Steps S106 and 107, the process at Step S108 may also be performed.

The components of each device illustrated in the drawings are only for conceptually illustrating the functions thereof and are not always physically configured as illustrated in the drawings. In other words, the specific shape of a separate or integrated device is not limited to the drawings; however, all or part of the device can be configured by functionally or physically separating or integrating any of the units depending on various loads or use conditions. For example, it is possible to integrate the capturing unit 16a and the synchronizing unit 16b to create a new capturing unit. Furthermore, by integrating the analyzing unit 16c, the motion vector extracting unit 16d, the scene change extracting unit 16e, and the audio extracting unit 16f, a new extracting unit may be created.

[b] Second Embodiment

Creating Program

Furthermore, the creating process performed by the creating apparatus 10 described in the above embodiments can be implemented by a program prepared in advance and executed by a computer such as a personal computer or a workstation. Accordingly, in the following, a computer that executes a creating program having the same function as that performed by the creating apparatus 10 described inn the first embodiment will be described with reference to FIG. 12.

Figure 12:
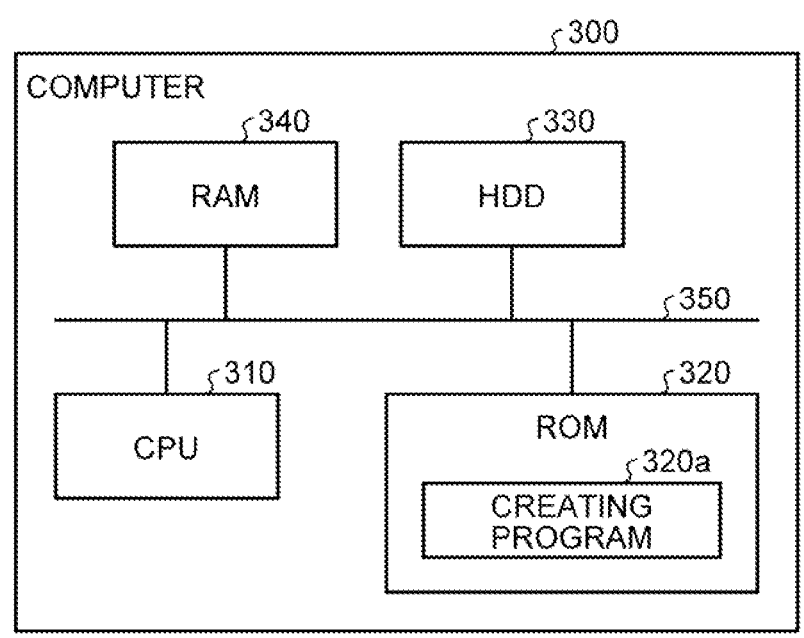
FIG. 12 is a block diagram illustrating a computer that executes a creating program.

FIG. 12 is a block diagram illustrating a computer that executes a creating program. As illustrated in FIG. 12, a computer 300 according to a second embodiment includes a central processing unit (CPU) 310, a read only memory (ROM) 320, a hard disk drive (HDD) 330, and a random access memory (RAM) 340, which are connected via a bus 350.

The ROM 320 stores therein, in advance, a creating program 320a having the same function as that described in the first embodiment, i.e., the capturing unit 16a, the synchronizing unit 16b, the analyzing unit 16c, the motion vector extracting unit 16d, the scene change extracting unit 16e, the audio extracting unit 16f, and the creating unit 16g. The creating program 320a may appropriately be integrated or separated. For example the creating program 320a may be separated into two programs: a program, which has the same function as that performed by the synchronizing unit 16b and the analyzing unit 16c, and a program, which has the same function as that performed by the capturing unit 16a, the motion vector extracting unit 16d, the scene change extracting unit 16e, the audio extracting unit 16f, and the creating unit 16g.

Then, the CPU 310 reads the creating program 320a from the ROM 320 and executes it.

The HDD 330 stores therein image data, a management table, and audio data. The image data, the management table, and the audio data correspond to the image data 15a, the management table 15b, and the audio data 15c, respectively.

Then, the CPU 310 reads the image data, the management table, and the audio data and stores them in the RAM 340. Furthermore, by using the image data, the management table, and the audio data stored in the RAM 340, the CPU 310 executes the creating program. For the data to be stored in the RAM 340, not all of the data is needed to be stored in the RAM 340 as long as only the data needed to be processed is stored in the RAM 340.

The creating program described above does not need to be stored in the ROM 320 from the beginning.

For example, the program is stored in a "portable physical medium", such as a flexible disk (FD), a CD-ROM, a DVD disk, a magneto-optic disk, an IC CARD, or the like that can be inserted in to the computer 300. Then, the computer 300 may read and execute the program from the flexible disk or the like described above.

Alternatively, the program may also be stored in "another computer (or a server)" connected to the computer 300 via a public circuit, the Internet, a LAN, a WAN, or the like. Then, the computer 300 may read and execute the program.

According to an aspect of a creating apparatus disclosed in the present invention, it is possible to further reduce a burden placed on a user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A creating apparatus comprising:
an interface that receives a plurality of video signals of images imaged at positions that are different by parallax; and
a processor coupled to the interface, wherein the processor executes a process comprising:
capturing the video signals received by the interface;
extracting, from at least one of the video signals from among the video signals, a display time-period except for a time period for which a motion vector in the video signals continues to exceed a predetermined threshold, when the time period continues longer than a predetermined period of time; and creating, for the display time-period, a first stereoscopic video signal having different depth for objects in an image by using the video signals and creating, for a time other than the display time-period, a second stereoscopic video signal having a same depth for all objects in an image by using one of the video signals from among the video signals.

2. The creating apparatus according to claim 1, wherein the extracting includes extracting the display time-period in accordance with one of the motion vector, a scene change, and audio analyzed from the video signals, or any combination thereof.

3. The creating apparatus according to claim 2, wherein the extracting includes determining, for images indicated by the video signals, whether the motion vector is greater than a predetermined threshold and extracting the display time-period except for a time period for which images having the motion vector that is greater than the predetermined threshold continue.

4. The creating apparatus according to claim 2, wherein the extracting includes determining, for images indicated by the video signals, whether the scene change occurs and extracting, in accordance with an image in which the scene change occurs, a start time or an end time of the display time-period.

5. The creating apparatus according to claim 3, wherein the extracting includes determining, for images indicated by the video signals, whether the scene change occurs and extracting, in accordance with an image in which the scene change occurs, a start time or an end time of the display time-period.

6. The creating apparatus according to claim 2, wherein the extracting includes determining, for images indicated by the video signals, whether audio is greater than a predetermined threshold and extracting, as the display time-period, a time period for which images having audio that is greater than the predetermined threshold continue.

7. The creating apparatus according to claim 3, wherein the extracting includes determining, for images indicated by the video signals, whether audio is greater than a predetermined threshold and extracting, as the display time-period, a time period for which images having audio that is greater than the predetermined threshold continue.

8. The creating apparatus according to claim 4, wherein the extracting includes determining, for images indicated by the video signals, whether audio is greater than a predetermined threshold and extracting, as the display time-period, a time period for which images having audio that is greater than the predetermined threshold continue.

9. The creating apparatus according to claim 5, wherein the extracting includes determining, for images indicated by the video signals, whether audio is greater than a predetermined threshold and extracting, as the display time-period, a time period for which images having audio that is greater than the predetermined threshold continue.

10. The creating apparatus according to claim 1, wherein the creating includes creating the second stereoscopic video signal by combining a first video signal and a second video signal obtained by shifting the first video signal by a predetermined parallax.

11. The creating apparatus according to claim 1, wherein the processor executes the process further comprising switching the first stereoscopic video signal and the second stereoscopic video signal at a time of occurrence of a scene change.

12. A creating method, executed by a computer, for creating a stereoscopic video signal from a plurality of video signals of images imaged at positions that are different by parallax, the creating method comprising:
    capturing the video signals of the images imaged at the positions that are different by parallax;
    extracting, from at least one of the video signals from among the video signals, a display time-period except for a time period for which a motion vector in the video signals continues to exceed a predetermined threshold, when the time Period continues longer than a predetermined period of time; and
    creating, for the display time-period, a first stereoscopic video signal having different depth for objects in an image by using the video signals and creating, for a time other than the display time-period, a second stereoscopic video signal having a same depth for all objects in an image by using one of the video signals from among the video signals.

* * * * *